(12) United States Patent
Hibbler et al.

(10) Patent No.: US 7,861,392 B2
(45) Date of Patent: Jan. 4, 2011

(54) METHOD OF ASSEMBLING A POWER TRANSMISSION DEVICE

(75) Inventors: John C. Hibbler, Lake Orion, MI (US); Richard L. Hughes, Rochester, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 1348 days.

(21) Appl. No.: 11/363,146

(22) Filed: Feb. 27, 2006

(65) Prior Publication Data
US 2007/0204454 A1 Sep. 6, 2007

(51) Int. Cl.
*B23P 11/00* (2006.01)
(52) U.S. Cl. .......................................... 29/429; 29/430
(58) Field of Classification Search .................... 29/429, 29/430, 822, 823, 824, 785, 786, 792, 793, 29/794; 198/465.1, 580
See application file for complete search history.

(56) References Cited

U.S. PATENT DOCUMENTS

| | | | |
|---|---|---|---|
| 1,408,047 A * | 2/1922 | Upp | ............................. 29/791 |
| 4,371,075 A | 2/1983 | Erlichman | |
| 4,722,653 A | 2/1988 | Williams et al. | |
| 4,793,055 A | 12/1988 | Shintani | |
| 5,150,781 A | 9/1992 | Deisenroth et al. | |
| 5,271,139 A * | 12/1993 | Sticht | ......................... 29/430 |
| 5,273,392 A | 12/1993 | Bernard, II et al. | |
| 5,353,495 A | 10/1994 | Terabayashi et al. | |
| 5,557,834 A * | 9/1996 | Miyanaka et al. | ........ 29/407.05 |
| 5,685,416 A | 11/1997 | Bonnet | |
| 5,893,208 A | 4/1999 | Sasaki et al. | |
| 6,010,016 A | 1/2000 | Siegal | |
| 6,116,842 A | 9/2000 | Harris et al. | |
| 6,339,873 B2 * | 1/2002 | Cha et al. | ..................... 29/783 |
| 6,502,301 B1 * | 1/2003 | Guner et al. | ................... 29/771 |
| 6,631,606 B2 | 10/2003 | Lawton et al. | |
| 6,804,880 B2 | 10/2004 | Yamamoto | |
| 7,090,068 B2 * | 8/2006 | Matsuo | .................... 198/465.1 |
| 7,364,028 B2 * | 4/2008 | Moriya et al. | ............. 198/347.1 |
| 2003/0101579 A1 * | 6/2003 | Murakami et al. | ............ 29/783 |

* cited by examiner

*Primary Examiner*—Jermie E Cozart
(74) *Attorney, Agent, or Firm*—Harness, Dickey & Pierce, P.L.C.

(57) ABSTRACT

A method of assembling a power transmission device includes positioning an operator along a conveyor system such that the operator may perform multiple operations to a single workpiece at more than one workstation as the workpiece moves along the conveyor system. The assembly method relates to both closed-loop and open-ended conveyor systems.

19 Claims, 5 Drawing Sheets

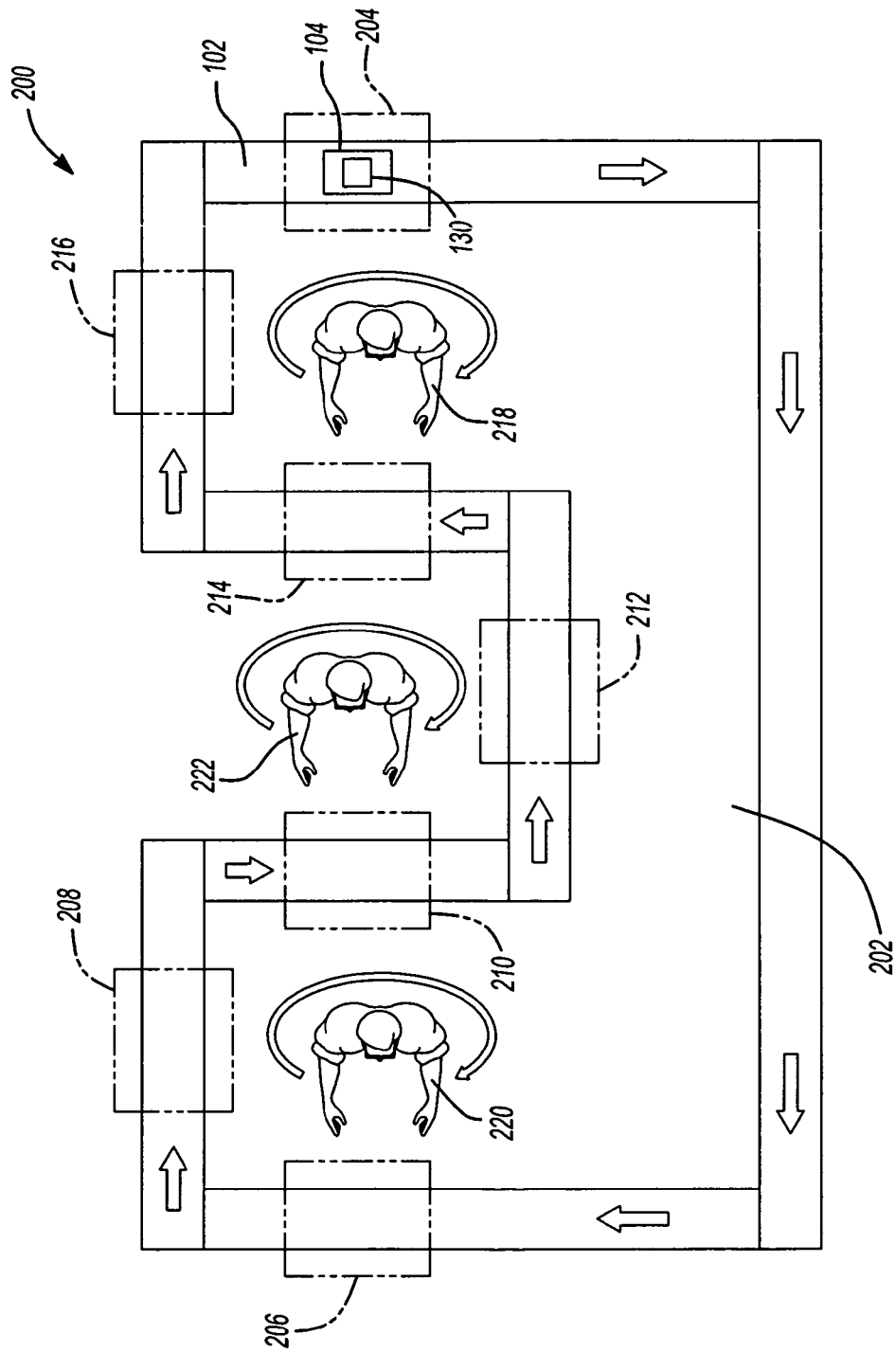

METHOD OF ASSEMBLING A POWER TRANSMISSION DEVICE

BACKGROUND AND SUMMARY OF THE INVENTION

The present invention generally relates to a method of assembling a power transmission device and, more particularly, to a method of assembly using a conveyor defining a serpentine path.

Current methods of assembling relatively large power transmission devices typically involve using either synchronous or non-synchronous assembly lines. The assembly line is utilized to increase the rate of production per unit time by having a number of employees repeatedly perform specific tasks. Many of the assembly lines are constructed in either a straight or carousel-style arrangement.

Some assembly lines are configured such that operators have access to only one side of the line. Accordingly, the number of operations performed by a single operator may be limited because access to only one side of a workpiece is available. Furthermore, due to the relatively compact arrangement of most assembly lines, the operator will typically have limited flexibility to perform additional tasks at other workstations. Depending on the configuration of the line and the complexity of the tasks performed by an individual operator, some operators on the assembly line may experience significant down time while other operators are substantially continuously occupied by the tasks required at their station. Therefore, inefficiencies exist because each operator's time is not fully utilized. These inefficiencies correspond to reduced output from the assembly line.

Furthermore, if an operator is tasked with performing assembly operations at multiple stations, the operator is often required to walk relatively large distances either around or over a conveyor track. For a number of reasons, this is not deemed as an efficient use of the operator's time and energy.

A typical straight assembly line 10 is depicted in FIG. 1. As is shown, operators 12, 14 and 16 are positioned on a first side 18 of a conveyor track 20. An operator 22 is positioned on a second side 24 of conveyor track 20. A machine 26 is positioned between operators 14 and 16 to perform an automated process. It should be noted that operators 12 and 22 are positioned on opposite sides of conveyor track 20 in proximity to a workpiece 28 positioned at a first station 30. Because operations need to be performed on both sides of workpiece 28, two operators 12 and 22 are required to be positioned within close proximity of the workpiece while it is positioned at station 30. This is not necessarily an efficient use of manpower.

FIG. 2 depicts a typical carousel-style assembly line 40. In a carousel-style line, the workpiece travels on a conveyor system 42 defining a closed loop path. While the closed loop path of the carousel-type assembly line may more efficiently utilize floor space, similar deficiencies exist. For example, operators 44, 46, 48, 50 and 52 have access to only one side of the workpiece during the assembly process. Furthermore, due to the relatively spaced apart format of the straight assembly line 10 and the carousel line 40, multiple and possibly redundant tools are required to be mounted from bridge and rail type systems at multiple locations on the line.

Accordingly, it may be desirable to provide an assembly line having a conveyor system defining a serpentine path where an operator or assembler has access to a single workpiece at multiple positions along the conveyor system where the operator is required to move only very small distances.

It may also be desirable to allow a single operator access to both sides of the workpiece without requiring the operator to cross over the conveyor system or rotate the workpiece using a mechanical rotation device positioned along the conveyor system.

SUMMARY OF THE INVENTION

The present invention relates to a method of assembly of a power transmission device including providing a continuous, closed loop conveyor system having a first substantially linear section operable to move a workpiece in a first direction, a second substantially linear section spaced apart from and positioned substantially parallel to the first section where the second section is operable to move the workpiece in a direction opposite the first direction and a third section interconnecting said first and second sections. The method also includes positioning an operator between the first and second sections as well as adjacent to said first, second and third sections where the operator performs a first assembly operation on the workpiece at the first station positioned along the first section. The workpiece is moved via the conveyor system to a second station positioned along the second section where the operator performs a second assembly operation on the workpiece at the second station.

Additionally, the present invention relates to a method of assembling a power transmission device by providing a continuous loop conveyor system defining a work area bounded by the continuous loop conveyor system. The work area is substantially shaped as an alternating wave form. The method also includes moving a workpiece along the continuous loop conveyor system and positioning an operator within the work area at a location where the operator has access to the workpiece at more than one station positioned along the continuous loop conveyor system.

Furthermore the present invention relates to another method of assembling a power transmission device including providing a conveyor system having a first end and a second end spaced apart from one another. The conveyor system defines a serpentine shape having a first substantially linear section spaced apart from and substantially parallel to a second substantially linear section. The first and second sections are interconnected by a third section. The method also includes moving a workpiece via the conveyor system from the first end to the second end and positioning an operator in a work area between the first and second linear sections where the operator performs a first assembly operation on the workpiece when the workpiece is positioned on the first section and a second assembly operation when the workpiece is positioned on the second section.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a schematic depicting an alternate shape closed loop conveyor system;

DETAILED DESCRIPTION OF THE PREFERRED EMBODIMENTS

The following description of the preferred embodiments is merely exemplary in nature and is in no way intended to limit the invention, its application, or uses.

Conveyor systems operable to perform the method of the present invention are depicted in FIGS. 3-6. While each Figure shows a different embodiment conveyor system, certain sections of each conveyor system include serpentine shapes that allow a single operator access to an individual workpiece multiple times during the assembly process. Similarly, it should be appreciated that the process or processes described in relation to any one conveyor system are not limited in their application to the specific embodiment discussed as shown but that the scope of the invention is defined by the claims.

Figure 1:
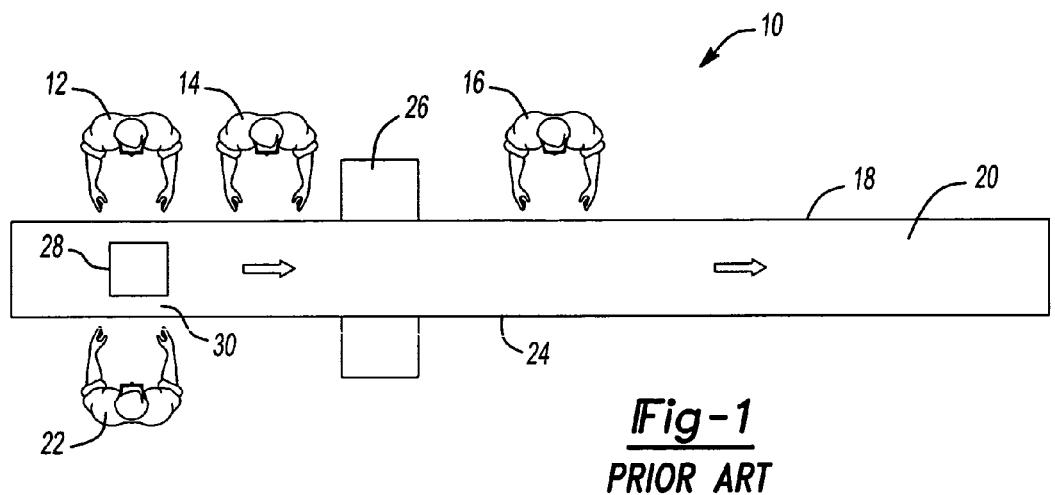
FIG. 1 is a schematic depicting a typical straight assembly line as known in the prior art.
Figure 2:
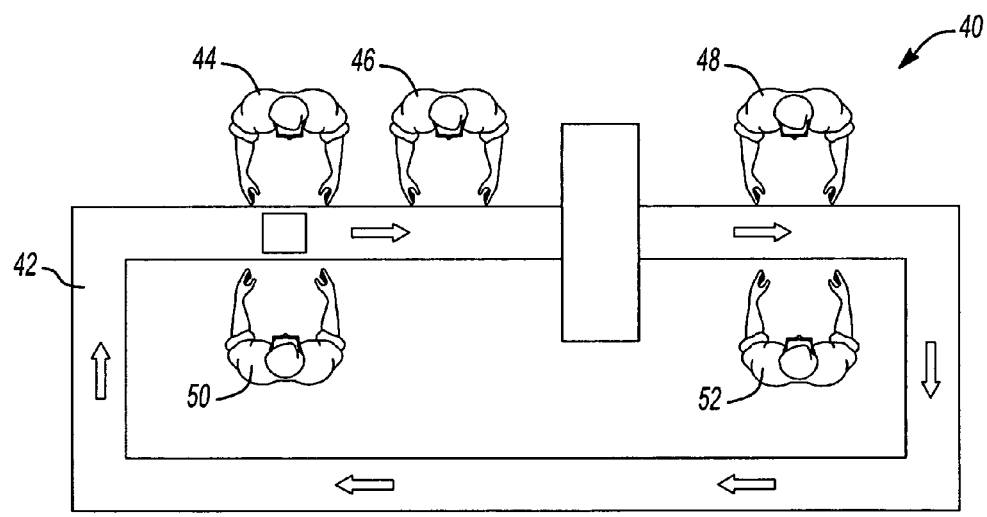
FIG. 2 is a schematic depicting a typical carousel-type assembly line also known in the prior art.
Figure 3:
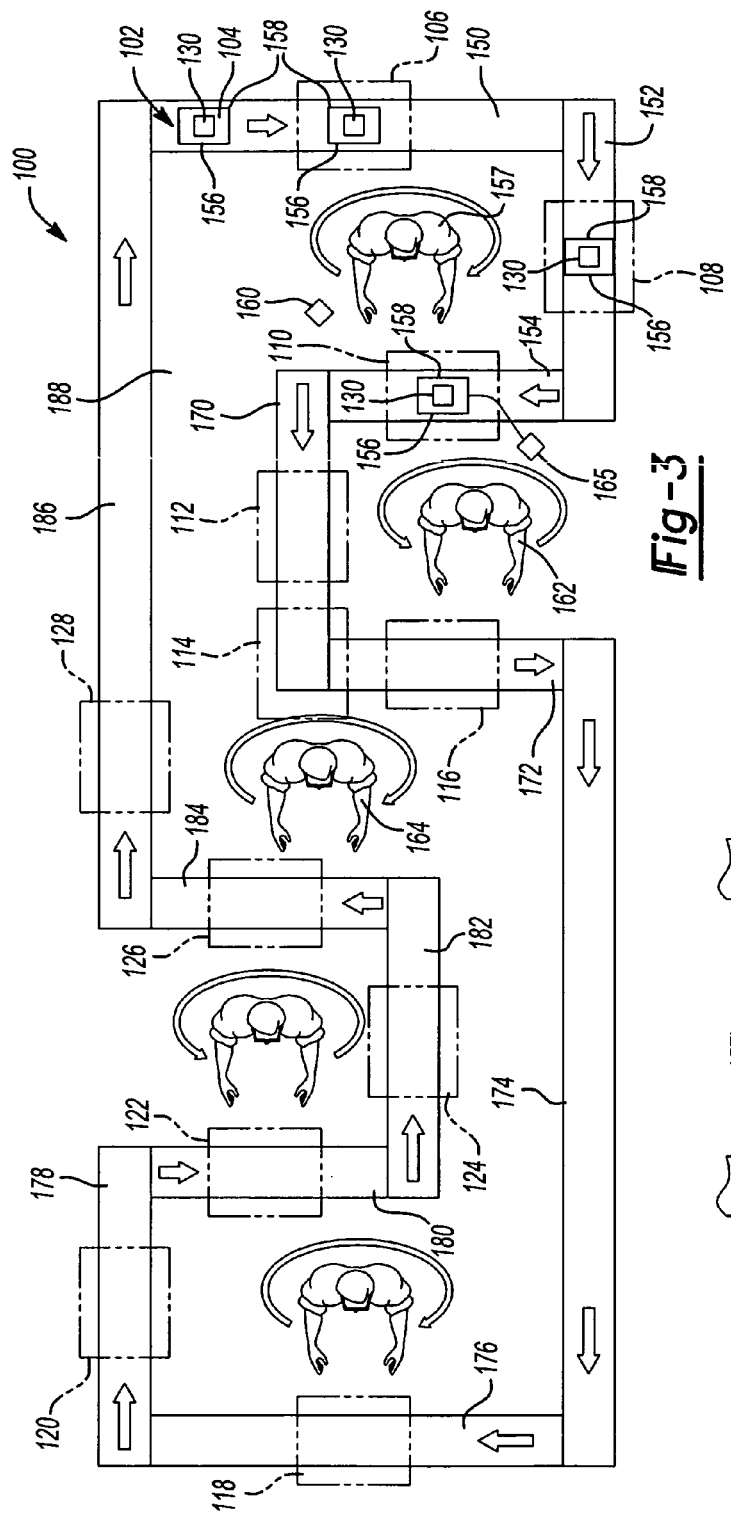
FIG. 3 is a schematic depicting a conveyor system of the present invention having a serpentine shape.

FIG. 3 shows a conveyor system 100 defining a closed loop path. Conveyor system 100 includes a track 102 operable to translate a pallet 104 throughout the conveyor system. Conveyor system 100 includes a plurality of mechanisms (not shown) operable to position pallet 104 at a number of stations 106, 108, 110, 112, 114, 116, 118, 120, 122, 124, 126 and 128. The stations are spaced apart from one another along track 102 to allow sufficient space to supply each station with components that are to be assembled to one another to create a power transmission device. For convenience, the partially assembled power transmission device will be referred to as a workpiece 130. Workpiece 130 is mounted to pallet 104 and travels from station to station where various operations are performed to further assemble, test or evaluate workpiece 130.

Figure 3A:
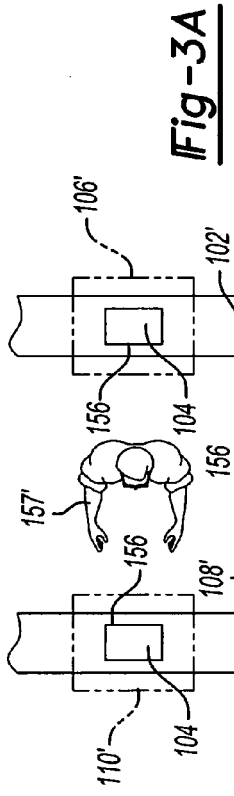
FIG. 3A is a schematic depicting a portion of an alternate embodiment conveyor system.

Conveyor system 100 includes a first substantially linear section of track 150 which includes station 106. Section 150 is coupled to another substantially linear section of track 152. Station 108 is located along section 152. A substantially linear section of track 154 is coupled to the end of section 152. Station 110 is located along section 154. Pallet 104 may be transferred from section 150 to section 152 and section 152 to section 154 in at least two ways. In a first embodiment transfer mechanism depicted in FIG. 3, a first side 156 of pallet 104 faces an operator 157 at station 106 while a second, opposite side 158 will face operator 157 at station 110. In an alternate embodiment transfer system depicted in FIG. 3A, pallet 104 travels along track 102' such that first side 156 of pallet 104 continues to face operator 157' at stations 106', 108' and 110'.

With reference to FIG. 3, sections 150 and 154 are spaced apart a distance to allow an operator 157 to perform the assembly or testing operations on workpiece 130 as required without physical impairment. Furthermore, sections 150 and 154 are spaced apart a distance such that operator 157 may easily access workpiece 130 at station 106, station 108 or station 110 without moving more than a few feet. In this manner, operator 157 will have unobstructed access to workpiece 130 at stations 106, 108 and 110. Tools 160 are mounted in proximity to operator 157 such that the operator may utilize a number of hand held or overhead mounted tools 160 at any of stations 106, 108 or 110.

While pallet 104 is positioned at station 110, an operator 162 is provided access to workpiece 130. Operator 162 has access to workpiece 130 two more times during the manufacturing process. Specifically, pallet 104 travels from station 110 to station 112 which is in close proximity to operator 162. Workpiece 130 and pallet 104 next travel to station 114 where an operator 164 is positioned to perform tasks on workpiece 130. As workpiece 130 and pallet 104 are released from workstation 114, workpiece 130 is positioned at station 116 where operator 162 has access to workpiece 130 the third and final time.

The serpentine conveyor path described facilitates the use of reusable fixturing or testing equipment that is coupled to workpiece 130 only while the workpiece is positioned on conveyor system 100 and is removed prior to removal of workpiece 130 from conveyor system 100. For example, operator 162 may install a test wire harness 165 to workpiece 130 at station 110. Wire harness 165 continues to be coupled to workpiece 130 as additional processes and/or testing are conducted at station 112 and/or station 114. Operator 162 has an opportunity to remove reusable wire harness 165 from workpiece 130 at station 116 after the testing has been completed. By positioning operator 162 in close proximity to multiple spaced apart stations, a separate transfer system or additional personnel are not required to shuttle wire harness 165 from a position downstream that would not be adjacent to operator 162 if a straight line or carousel-type assembly line were implemented.

As shown in FIG. 3, a number of operators may be positioned along a number of serpentine shaped sections that are coupled to one another to accomplish the specific assembly task at issue. Furthermore, operators may be placed inside the continuous loop and outside the continuous loop to optimize the workflow and maximize the utilization of each operator.

Additional track sections 170, 172, 174, 176, 178, 180, 182, 184 and 186 are positioned and interconnected to one another as shown in FIG. 3. One end of section 186 is coupled to section 150 to close the continuous loop. The shape of conveyor system 100 may be described as defining an interior workspace 188 substantially shaped as the letter "S," a sinusoidal wave shape or a square wave shape. This shape of the closed loop conveyor system provides multiple locations for operators to be placed where many of the operators have access to workpiece 130 at two or more spaced apart stations that are along track 102.

FIG. 4 depicts an alternate embodiment conveyor system 200. It should be appreciated that conveyor system 200 is substantially similar to conveyor system 100. As such, like elements will retain their previously introduced reference numerals. Conveyor system 200 is a closed loop system having track 102 operable to move pallet 104 containing workpiece 130 throughout the closed loop. Conveyor system 200 surrounds a workspace 202 substantially shaped as the letter "U." Stations 204, 206, 208, 210, 212, 214 and 216 are spaced apart from one another and positioned at various locations along track 102. An operator 218 is positioned within workspace 202 to have convenient access to workpiece 130 when pallet 104 is positioned at any one of stations 204, 214 or 216. Similarly, an operator 220 has access to workpiece 130 when pallet 104 is positioned at any one of stations 206, 208 and 210. An operator 222 is positioned outside the closed loop formed by track 102 yet still has convenient access to workpiece 130 when pallet 104 is positioned at any one of station 210, station 212 or station 214.

Figure 5:
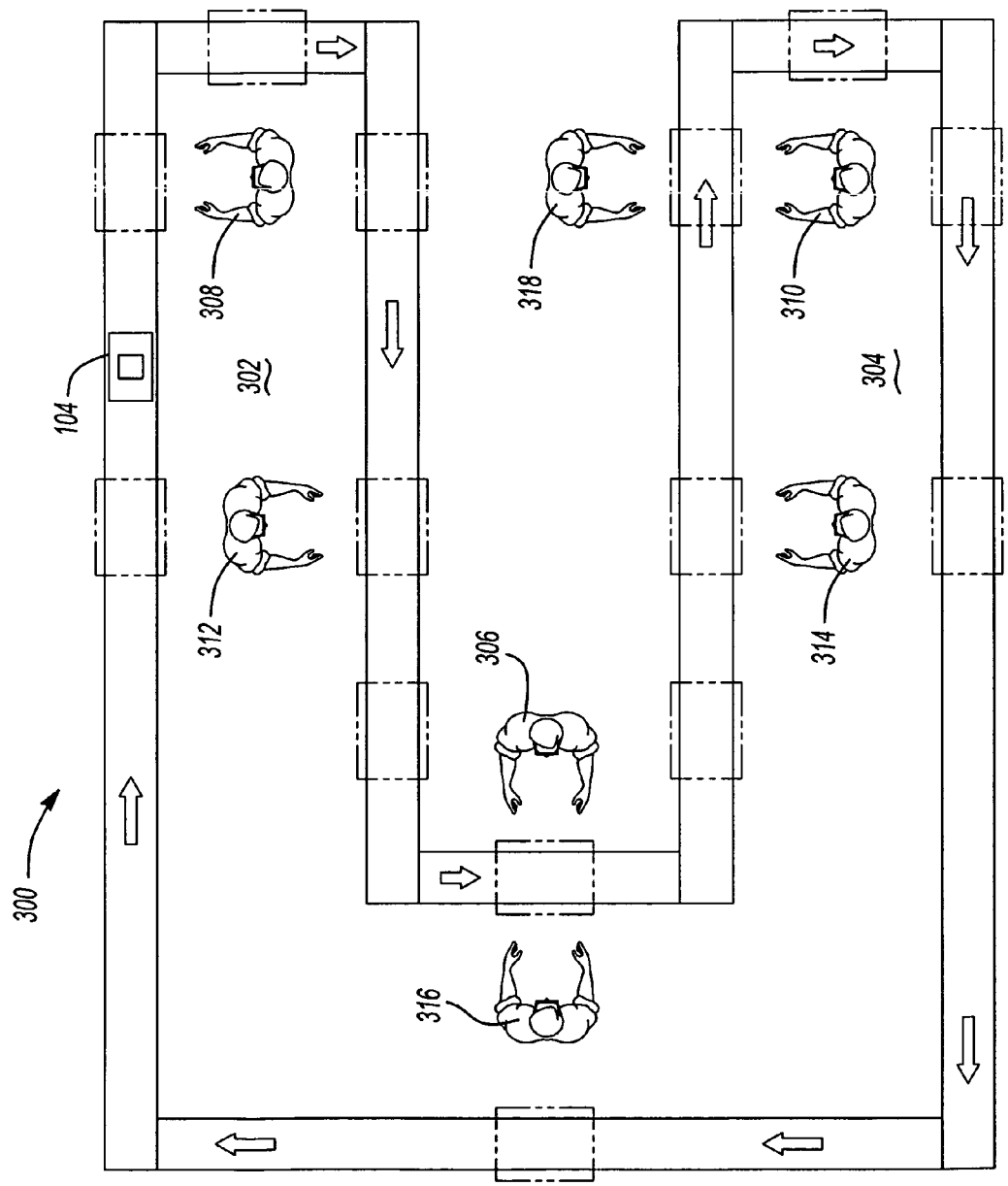
FIG. 5 is a schematic depicting another alternate embodiment closed loop conveyor system.

FIG. 5 is a modification of the U-shaped or one-half "S"-shaped conveyor system of FIG. 4. FIG. 5 depicts another substantially "U"-shaped closed loop conveyor system identified by reference numeral 300. Conveyor system 300 is substantially similar to conveyor system 200 except for leg portions 302 and 304 of the U-shaped open space are extended such that multiple operators may be positioned in the space between leg portions 302 and 304. In the embodiment depicted in FIG. 5, operators 306, 308 and 310 are positioned in close proximity to three substantially linear portions of track 102. As such, it is contemplated that each of the operators 306, 308 and 310 would have access to perform operations on workpiece 130 at three different stations where one station is located on each linear portion. Other operators depicted at reference numerals 312, 314, 316 and 318 are positioned between two substantially parallel linear portions of track 102. Based on the position of these operators, they would have an opportunity to access workpiece 130 at two different stations along the closed loop path. One skilled in the art will appreciate that operators 312, 314, 316 and 318 do not have access to pallet 104 at consecutive stations because other workstations and operators are positioned at track positions therebetween. This operator positioning scheme adds additional flexibility and opportunity to design a well balanced assembly line where each operator's time is efficiently utilized.

Figure 6:
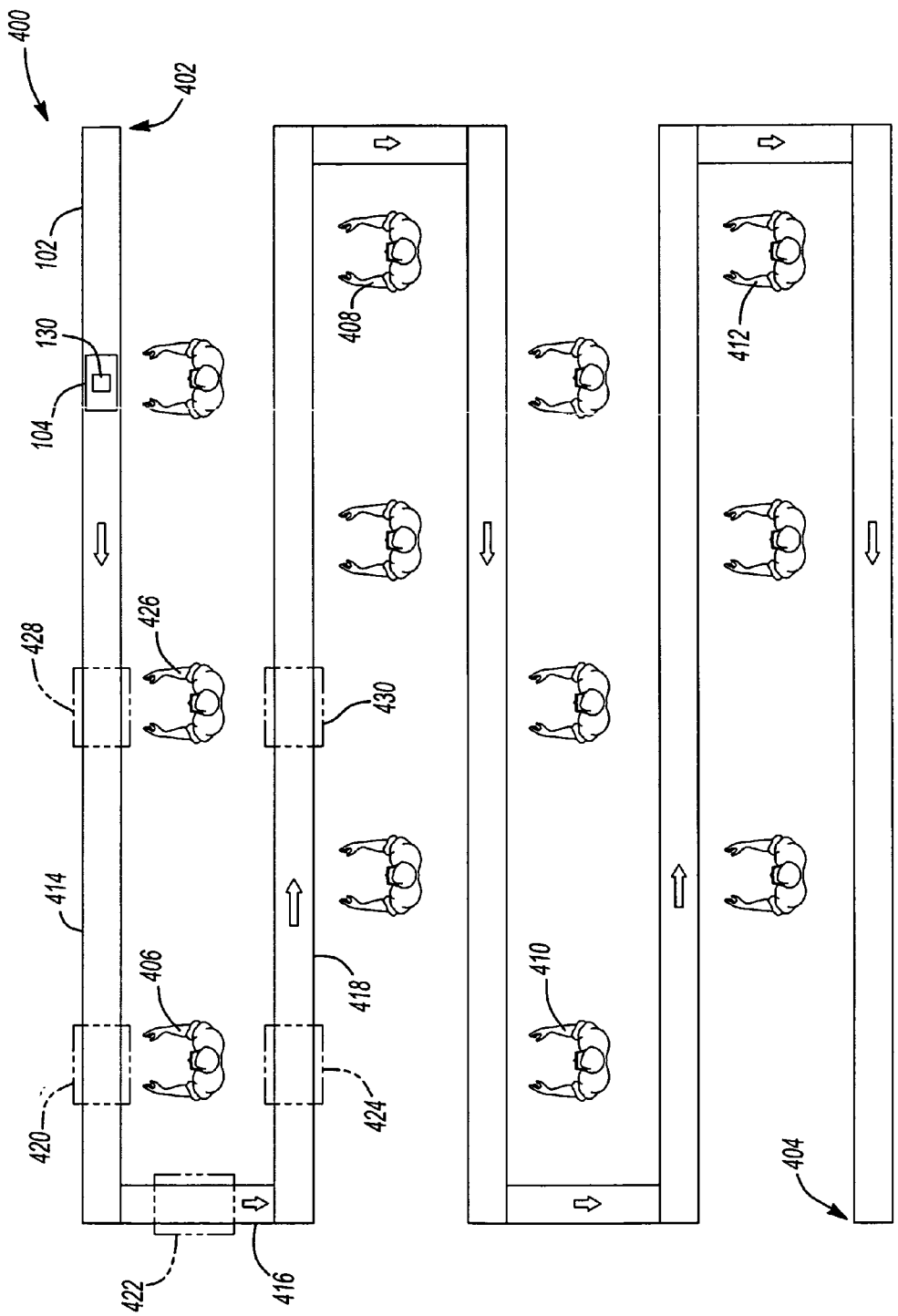
FIG. 6 is a schematic depicting an open-ended conveyor system having a serpentine shape according to the principles of the present invention.

FIG. 6 depicts an alternate embodiment open conveyor system 400 where workpiece 130 enters the assembly line at a first end 402 and exits the assembly line at a second end 404. Conveyor system 400 is substantially similar to the conveyor systems previously described in that a serpentine path is defined by a track 102 such that the track 102 repeatedly passes by certain operators to allow them an opportunity to assemble components, test and/or perform other operations to a single workpiece at multiple stations as the workpiece travels through the assembly line. Operators 406, 408, 410 and 412 are positioned in close proximity to three substantially linear sections of track 102. For example, operator 406 is positioned near the closed end of the serpentine section of track where linear sections 414, 416 and 418 interconnect. Positioning operator 406 at this location allows the operator relatively easy access to workstations 420, 422 and 424. An operator 426 is positioned to act on workpiece 130 when pallet 104 is positioned at one of stations 428 or 430. Station 428 is positioned along section 414 while station 430 is positioned along a substantially parallel and spaced apart section 418. It should be appreciated that stations 428 and 430 are not immediately adjacent one another because pallet 104 passes through stations 420, 422 and 424 before reaching station 430. Accordingly, conveyor system 400 may be designed to include an appropriate number of operators positioned proximate to one, two or three stations to optimize the output of the assembly line.

From the foregoing description of various embodiments, it should be appreciated that the present invention is adaptable to many assembly line configurations. Accordingly, one skilled in the art will readily recognize from such discussion, and from the accompanying drawings and claims, that various changes, modifications and variations may be made therein without department from the spirit and scope of the invention as defined in the following claims.

What is claimed is:

1. A method of assembling a power transmission device, the method comprising;

providing a continuous, closed loop conveyor system having a first substantially linear section operable to move a workpiece in a first direction, a second substantially linear section spaced apart from and positioned substantially parallel to said first section where said second section is operable to move said workpiece in a direction opposite said first direction and a third section interconnecting said first and second sections;

positioning an operator between said first and second sections as well as adjacent to said first, second and third sections, said operator performing a first assembly operation on said workpiece at said first station positioned along said first section;

moving said workpiece via said conveyor system to a second station positioned along said second section, said operator performing a second assembly operation on said workpiece at said second station coupling a removable member to said workpiece at a station;

translating said workpiece to another station;

performing an operation at said another station with said removable member coupled to said workpiece;

removing said removable member;

translating said workpiece out of said another station; and coupling said removable member to a second workpiece.

2. The method of claim 1 further including positioning said workpiece at another station intermediate said first and second stations.

3. The method of claim 2 wherein said another station is positioned along said third section.

4. The method of claim 3 wherein said third section includes a substantially linear portion.

5. The method of claim 1 wherein said operator walks less than four meters between said first and second stations.

6. The method of claim 1 wherein said distance between said first section and said second section is about four meters.

7. The method of claim 1 further including orienting said workpiece such that a first side of said workpiece faces said operator when said workpiece is positioned at said first station, said conveyor system translating said workpiece between said first section and said second section in a manner that an opposite side of workpiece faces said operator when said workpiece is positioned at said second station.

8. The method of claim 1 wherein said closed loop conveyor system defines an area within said loop shaped as the letter "S."

9. The method of claim 8 further including positioning additional operators both inside and outside the loop at locations proximate to three perpendicularly oriented sections of said conveyor system.

10. The method of claim 9 wherein each of said additional operators perform operations on said workpiece at two spaced apart stations on said conveyor system.

11. The method of claim 1 wherein said first, second and third sections form a first substantially "U"-shaped path.

12. The method of claim 11 further including causing said workpiece to travel along a second substantially "U"-shaped path.

13. The method of claim 12 further including positioning a second operator between the legs of the second "U"-shaped path, said second operator performing operations on said workpiece at more than one station positioned on said conveyor system.

14. The method of claim 13 wherein one leg of said first "U"-shaped path is common with one leg of said second "U"-shaped path.

15. A method of assembling a power transmission device, the method comprising:

providing a conveyor system having a first end and a second end spaced apart from one another, wherein the conveyor system defines a serpentine shape having a first substantially linear section spaced apart from and substantially parallel to a second substantially linear section, the first and second sections being interconnected by a third section;

moving a workpiece via the conveyor system from the first end to the second end; and positioning a first operator in a work area between the first and second linear sections where the first operator performs a first assembly operation on the workpiece when the workpiece is positioned on the first section and a second assembly operation when the workpiece is positioned on the second section;

wherein a third operator is positioned at a station on the conveyor system and performs an operation on the workpiece after the first assembly operation is performed and before the second assembly operation is performed by the first operator.

16. The method of claim 15 wherein the conveyor system includes a fourth section spaced apart from and substantially parallel to the first and second sections, a fifth section interconnecting the fourth and second sections.

17. The method of claim 16 further including positioning a second operator in a second work area between the second and fourth sections where the second operator performs a first assembly operation on the workpiece when the workpiece is positioned on the second section and a second assembly operation when the workpiece is positioned on the fourth section.

18. A method of assembling a power transmission device, the method comprising:

providing a continuous closed-loop conveyor having at least three work centers, each of the work centers having a first side, a second side and a third side that interconnects the first and second sides such that each work center is generally U-shaped;

positioning an operator in each of the work centers; and sequentially conveying a housing of the power transmission device to each of the work centers and performing an associated sequence of assembly operations with the housing of the power transmission device;

wherein at each of the work centers:

a corresponding one of the operators performs a first operation in the associated sequence of assembly operations at a first station associated with a first one of the first, second and third sides, the housing of the power transmission device being positioned relative to the corresponding one of the operators in a first orientation;

the housing of the power transmission device is translated to a second work station associated with a second one of the first, second and third sides;

the corresponding one of the operators pivots within the work center to face the housing when the housing is at the second work station such that the housing of the power transmission device is positioned relative to the corresponding one of the operators in a second, different orientation; and the corresponding one of the operators performs a second operation in the associated sequence of assembly operations at the second station.

19. The method of claim 18, further comprising:

coupling a removable member to the housing;

translating the workpiece to another station;

performing an operation at the another station with the removable member coupled to the housing;

removing the removable member; and translating the housing out of the another station; and coupling the removable member to a second housing.

\* \* \* \* \*